Oct. 17, 1961     D. E. BUXTON     3,004,472
MIRROR WITH MEANS FOR ADJUSTABLY FLEXING SAME
Filed July 9, 1958     2 Sheets-Sheet 1
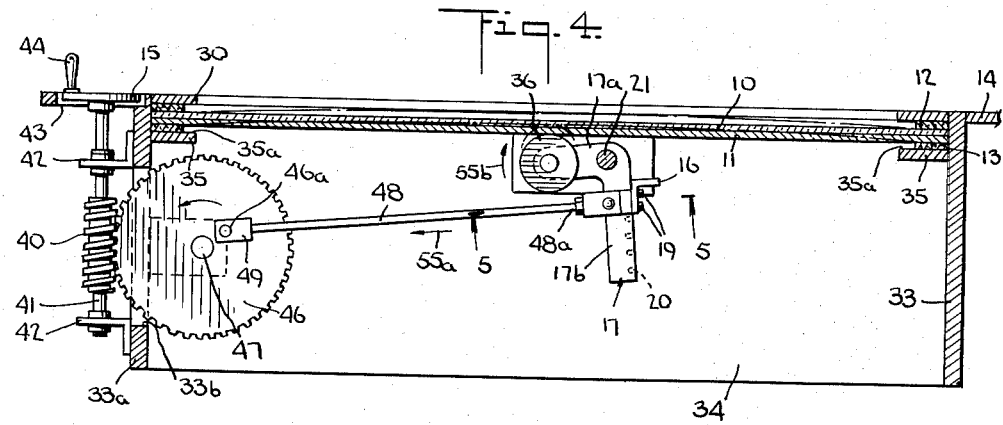
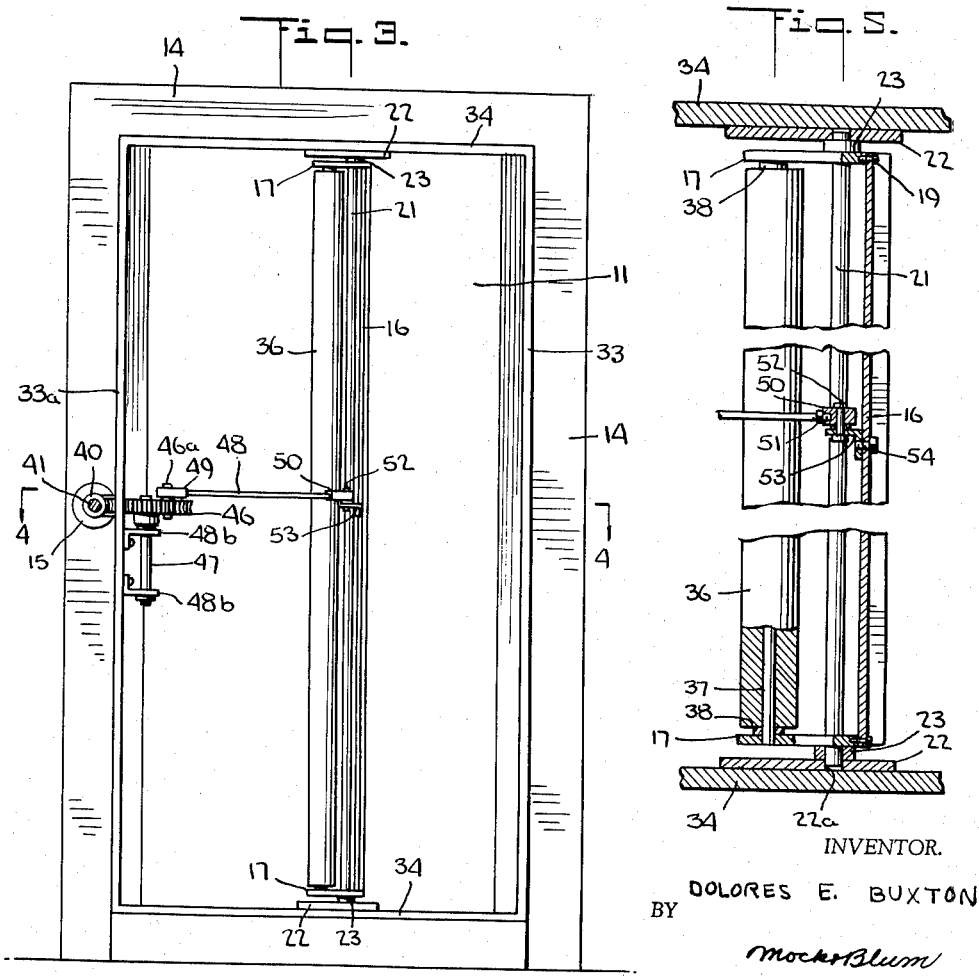
INVENTOR.
DOLORES E. BUXTON
BY Mocker Blum
ATTORNEYS Oct. 17, 1961 D. E. BUXTON 3,004,472
MIRROR WITH MEANS FOR ADJUSTABLY FLEXING SAME
Filed July 9, 1958 2 Sheets-Sheet 2
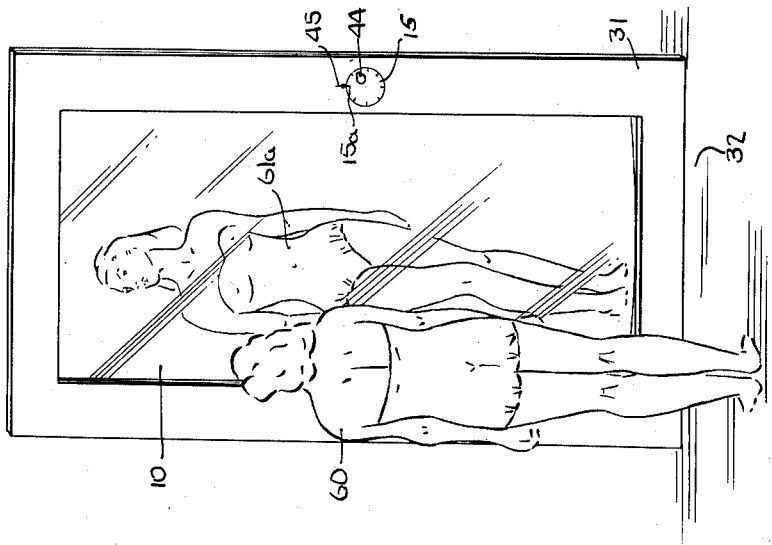
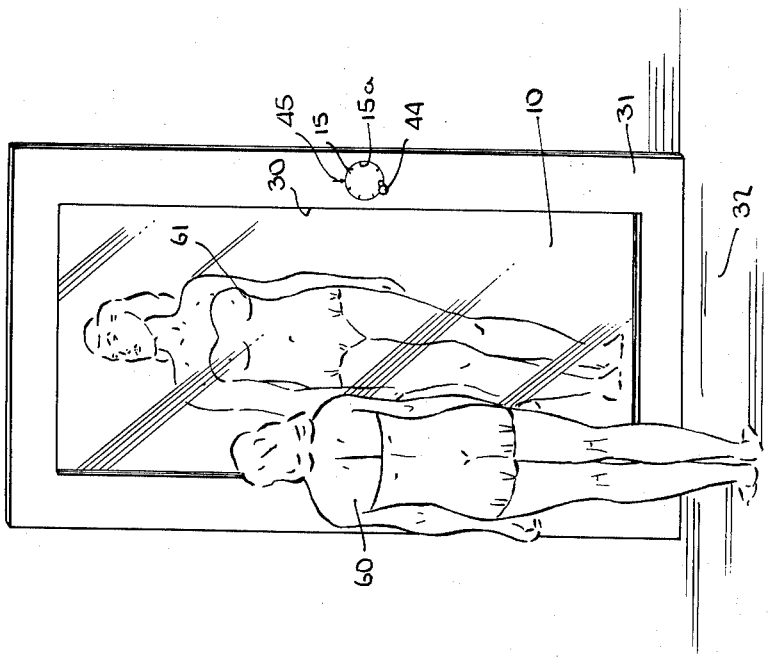
INVENTOR.
DOLORES E. BUXTON
BY
ATTORNEYS United States Patent Office 3,004,472
Patented Oct. 17, 1961

3,004,472
MIRROR WITH MEANS FOR ADJUSTABLY FLEXING SAME
Dolores E. Buxton, New York, N.Y., assignor to The Glemby Company, Inc., New York, N.Y., a corporation of Delaware
Filed July 9, 1958, Ser. No. 747,521
2 Claims. (Cl. 88—76)

This invention relates to improvements in mirrors, and in particular relates to improved means for adjusting the curvature of a plate glass mirror.

My invention has particular application to use in slenderizing salons, although the invention is not limited to use therein. An important feature of the invention is that it makes it possible for a person looking at himself in the mirror to see visually how he will look after he has lost a selected amount of weight.

It is known that a flat planar mirror will show a generally true image of a person viewing himself by means of a mirror. It is also known that if a mirror is outwardly convex with respect to a vertical axis, a person seen by means of the mirror will appear thinner than he actually is.

An important object of this invention is to provide an improved plate glass mirror, the curvature of which may be varied at will within selected limits, so as to vary the appearance of a person as viewed by means of the mirror. Another important object of this invention is to provide an improved plate glass mirror which is normally flat and which may be curved within a selected limit so as to be outwardly convex with respect to a vertical axis, the curvature being adjustable so as to indicate visually to a person viewing himself in the mirror his approximate change of appearance which will result from selected loss of weight.

Other objects and advantages of this invention will become apparent from the following description, in conjunction with the annexed drawings, in which a preferred embodiment of the invention is disclosed.

In the drawings:

FIGURE 1 is a front perspective view of my improved mirror, showing same in planar condition and showing a woman viewing herself by means of the mirror. A normal image of the woman is thereby produced.

FIGURE 2 is a view similar to FIG. 1, but showing the mirror adjusted so as to be slightly forwardly convex with respect to the central vertical axis thereof. The image of the woman is thereby shown reduced in width as compared to her image in FIG. 1.

FIGURE 3 is a rear elevational view of my improved mechanism.

FIGURE 4 is a section on line 4—4 of FIGURE 3.

FIGURE 5 is a fragmentary section on line 5—5 of FIG. 4.

The drawings are substantially to scale of a working model of the invention, and reference is made to the drawings to complete the disclosure herein.

Upon reference to the drawings in detail, it will be noted that they show a full length mirror and frame resting upon floor 32 and having a front frame member 31. This front frame member 31 has a central rectangular cut-out 30. Said frame member 31 may be supported in its generally vertical position upon floor 32 by any suitable means. Optionally, said frame member 30 is a front member of a box-like frame having side walls 33 and 33a and top and bottom walls 34. Optionally, also, said front frame member 31 extends inwardly of side walls 33 and also has a marginal portion 14 extending outwardly of the frame members 33, 33a and 34.

In order to support the mirror, flanges 35 extend inwardly from walls 33 and 33a and extend in parallel spaced relationship to the front frame member 30. As a result, the frame is provided with vertically extending side channels 35a respectfully located between flanges 35 and frame member 30.

Any suitable plate glass mirror may be employed, the mirror shown consisting of a normal rectangular sheet of plate glass 10 and a backing plate 11 located behind and in abutment with plate 10. The mirror may be silvered in the usual manner. The side marginal portion of plates 10 and 11 extend into the respective channels 35a and are respectfully held spaced from frame member 30 by spacers 12 and from flanges 35 by spacers 12 and 13 may be made of resilient material.

As an improved feature of this invention, means are provided for exerting a force upon the rear of plate 11, along its vertically extending central axis, so as to bow the mirror forwardly and thereby make it forwardly convex.

This mechanism includes bearing plates 22 respectfully fixed to the opposing faces of frame walls 34, behind and adjacent the mirror plates 10 and 11. Shaft 21 extends vertically, and the ends of shaft 21 extend turnably into respective bearing recesses 22a in plates 22.

The mechanism further includes upper and lower rocker arms 17 mounted upon shaft 21 and separated from plates 22 by means of respective washers 23. These rocker arms 17 are respectfully L-shaped. Each arm 17 has a short segment 17a which extends from shaft 21 in a direction generally parallel to plate 10 and in a direction toward the center of the mirror. The other segment 17b of arm 17 extends generally rearwardly from shaft 21.

A vertically extending roller 36, which may be made of hard rubber or the like, is mounted upon a shaft 37 which extends into openings of the respective arm segments 17a adjacent the free ends thereof, said roller 36 being spaced from arm segments 17a by means of washers 38. Said roller 36 preferably bears against the central vertical axis of plate 11.

In order to make a rigid frame assembly for roller 36, a vertically extending angle bar 16 is connected to arm segments 17b by means of screws 19. Optionally, for each arm segment 17b, two horizontally spaced screws 19 extend through holes in angle bar 16 and into recesses selected from a series of horizontally spaced threaded recesses 20 in the outer side edge of segment 17b.

Drive means are provided to move rocker arms 17 and thereby move roller 36 in the manner desired, said drive means including a horizontally extending worm gear 40 mounted upon the shaft 41, which is turnably mounted upon the outside of wall 33a by means of bracket assemblies 42. Said shaft 41 extends forwardly of the front bracket assembly 42 to a cut-out or hole 43 within the front frame marginal portion 14. A dial 15 is mounted upon shaft 41 within opening 43 and is provided adjacent its periphery with a handle 44 which may be employed as desired to turn worm gear 40. Optionally, the front face of dial 15 may be supplied with any appropriate indicia 15a and an index marking 45 may be provided on the front face of frame portion 14 adjacent said dial 15.

A gear 46 meshes with worm gear 40. This gear 46 is mounted upon a vertically extending shaft 47 which is turnably supported by bracket assemblies 48 mounted upon the inner face of wall 33a. Said gear 46 extends through an opening 33b in wall 33a so as to mesh with worm gear 40. An eccentric 46a is turnably mounted upon the upper face of gear 46.

One end of link rod 48 is connected by bracket 49 to eccentric 46a. The other end of link rod 48 is threaded at 48a and is screwed into bracket plate 50. Adjusting nut 51 holds the assembly secured in the usual way. Said plate 50 is turnably mounted by pivot rivet 52 upon the horizontal arm of an angle bar 53. The vertical arm of angle bar 53 is secured by bolt 54 to the center of angle iron 16.

It will be apparent that when dial 15 is turned so as to move gear 46, roller 36 is moved inwardly or outwardly as the case may be. In the position of eccentric 46a shown in FIG. 4, movement of gear 46 in the direction of arrow 55 causes movement of link 48 in the direction of arrow 55a and forward movement of roller 36, in the direction of arrow 55b. It will be apparent that the movement of roller 36 is proportional to the extent of which gear 46 is turned.

FIGURES 1 and 2 illustrate the operation of my improved mechanism. FIG. 1 shows mirror plate 10 in its flat or untensioned position corresponding to the solid line position of roller 36 in FIG. 4. FIG. 1 shows a figure of a woman 60, and shows her normal image 61 in the mirror. This image 61 is full width. By way of illustration, handle 34 is shown in its lowermost position in FIG. 1. This may correspond to a zero reading of dial 15.

FIG. 2 shows mirror 10 in a flexed position extending to a movement of roller 36 to its broken line position of FIG. 4. In this position, the mirror is slightly forwardly convex about the central vertical axis thereof. In FIG. 2, the image 61a of the woman 60 is reduced in width as compared to the normal reflection of FIG. 1. FIG. 2 shows handle 44 moved in a clockwise direction from its position of FIG. 1.

FIG. 2 shows the subject how she may look after she has lost weight. As an important feature of the invention, dial 15 may be calibrated so that the reading to which index 45 points in FIG. 2 shows the number of pounds which the subject must lose in order to achieve an actual figure corresponding to the image 61a shown in the mirror.

If it is necessary to change the setting of dial 15, corresponding to a given curvature of the mirror, this may be accomplished by changing the holes 20 into which bolts 19 are screwed.

While I have disclosed a preferred embodiment of my invention, and have indicated various changes, omissions, and additions which may be made therein, it will be apparent that various other changes, omissions, and additions may be made therein without departing from the scope and spirit thereof.

Thus, it will be apparent that the mechanism coupling control dial 15 and roller 36 may be varied.

I claim:
1. In a mirror assembly, a frame adapted to be placed in generally upstanding position, said frame having opposed side channels, a normally flat plate glass mirror mounted in said frame with the side marginal portions of said mirror positioned within said channels, resilient spacer strips co-extensive in height with the mirror between the opposite faces of said mirror and the respective opposing faces of said channels, said mirror being adapted to be outwardly flexed along the central vertical axis thereof and being resilient, a roller of length substantially equal to the height of the mirror, means adjustably mounting said roller to extend generally vertically and against the rear face of said mirror along said central vertical axis and so as to be forwardly and rearwardly movable, and variable means for moving said roller under tension against said mirror so as to flex said mirror outwardly, and dial indicating means operatively connected with said variable means for indicating the degree of distortion of an image due to flexing of the mirror.

2. A mirror assembly according to claim 1, said dial indicating means including a dial mounted upon the front of said frame so as to be turnable about a horizontal axis, a turning handle for said dial, means coupling said dial to said roller mounting means, and marking indicia associated with said dial and with said frame and calibrated to indicate to a subject posed in front of said mirror the apparent loss of weight corresponding to reduction in image width resulting from flexing said mirror outwardly.

References Cited in the file of this patent
UNITED STATES PATENTS

| | | |
|---|---|---|
| 840,084 | Muller | Jan. 1, 1907 |
| 972,373 | Hebig | Oct. 11, 1910 |
| 1,457,209 | Chanier | May 29, 1923 |
| 1,910,119 | Moats | May 23, 1933 |
| 2,664,785 | Roehig | Jan. 5, 1954 |
| 2,707,903 | Trombe | May 10, 1955 |
| 2,733,637 | Joseph | Feb. 7, 1956 |

FOREIGN PATENTS

| | | |
|---|---|---|
| 879,321 | Germany | June 11, 1953 |